United States Patent [19]

Harter

[11] 4,378,778
[45] Apr. 5, 1983

[54] IGNITION SYSTEM FOR INTERNAL COMBUSTION ENGINES

[75] Inventor: Werner Harter, Hummelberg, Fed. Rep. of Germany

[73] Assignee: Robert Bosch GmbH, Stuttgart, Fed. Rep. of Germany

[21] Appl. No.: 297,612

[22] Filed: Aug. 31, 1981

[30] Foreign Application Priority Data

Sep. 12, 1980 [DE] Fed. Rep. of Germany ....... 3034440

[51] Int. Cl.³ .............................................. F02P 5/04
[52] U.S. Cl. .................................. 123/609; 123/416; 123/644
[58] Field of Search ................. 123/609, 611, 644, 416

[56] References Cited

U.S. PATENT DOCUMENTS

| | | | |
|---|---|---|---|
| 4,081,995 | 4/1978 | Griffith et al. | 123/416 |
| 4,198,936 | 4/1980 | Pagel et al. | 123/609 |
| 4,248,195 | 2/1981 | Gorille | 123/609 |
| 4,253,443 | 3/1981 | Seeger et al. | 123/609 |

Primary Examiner—Tony M. Argenbright
Assistant Examiner—Andrew M. Dolinar
Attorney, Agent, or Firm—Frishauf, Holtz, Goodman & Woodward

[57] ABSTRACT

Timing increment signals produced by an engine driven tachogenerator are used for controlling both ignition timing shift and the dwell time of the interruptor switch of the ignition system. Counting of increment pulses by the ignition coil primary current rises to a predetermined value (Io) are measures a dwell time fraction and provides a count result that goes into a computation of which the result measures the duration of a counting of increments between the end of one dwell time and the beginning of the next. For better dynamic behavior the count value representing the dwell time fraction ($\beta t$) is corrected in a calculating stage (16–18) by a factor which represents the proportional change in the duration of an increment signal (such a signal at a fixed point in the cycle to the most increment signal).

11 Claims, 3 Drawing Figures

IGNITION SYSTEM FOR INTERNAL COMBUSTION ENGINES

BACKGROUND AND PRIOR ART

This invention concerns an engine ignition system with control of the dwell time during which the primary circuit of an ignition coil is closed for current flow prior to interruption for exciting an ignition pulse, such control being accomplished by an increment transducer driven by the engine and means for counting increments thus provided during a portion of the dwell time determined by the primary current flow up to a predeterminable current value, so that the counting means result controls the duration of an increment counting procedure between the previous dwell end and the succeeding beginning of the dwell time of the next cycle. An ignition system with an incrementing transducer for such a purpose is already known from German published patent application DE-OS No. 2 711 8. The known regulation of dwell time, which is equivalent to dwell angle in terms of crankshaft rotation, is based on the known principle that the magnitude of the following dwell angle is the K-fold multiple of the portion of the previous dwell angle in which the ignition coil primary current has risen to 1/K of the nominal value. The disadvantage of this known principle is that at high acceleration, particularly from lower starting speeds, the following dwell angle thus set is too small. After the beginning of counting out the open time no further substantial influence on the beginning of the following dwell time is possible.

SUMMARY OF THE INVENTION

It is an object of the invention to provide an ignition system in which even after the beginning of the counting out of the open time of the ignition coil primary circuit the beginning of the closed or dwell time that follows can still be corrected.

Briefly, the treshold value containing the K-factor is continuously modified in dependence upon acceleration. A very good dynamic fit results from this feature and even under very strong accelerations the dwell angle is subject to only unsubstantial errors.

More particularly, the count value obtained during the partial dwell time is corrected in a computing stage by the ratio of the duration of the increment signal at a reference point in the cycle to the duration of the most recent or current moment increment signal.

It is particularly advantageous for a first count value dependent upon the duration of the dwell time fraction to be multiplied at the end of the dwell time fraction by a second count value and then stored, the second count value being dependent upon the duration of an increment of the incrementing transducer. This duration can preferably be counted out at a fixed frequency. The temporarily stored count value is then continuously divided by a count value that corresponds to the duration of the most recent increment signal. In this manner a continuous correction dependent upon acceleration is provided for the count value that determines the beginning of the next dwell time.

It is also advantageous to provide an auxiliary arrangement to set a dwell time as an emergency provision and for starting operation, involving an ignition computer or an ignition timing transducer that provides an auxiliary control signal for the beginning of the dwell time at a fixed number of increments before the ignition moment or before the upper dead point of the piston in the cylinder. A counter counts down during the fractional dwell time at a fixed frequency from a predetermined count value and then counts out the results so that upon reaching another predetermined count value an auxiliary control signal for the ignition moment (dwell time end) can be provided.

Finally the dynamics of the operation can be further improved by forming the difference from the previous and the current ignition angle, in the ignition moment generator constituted as an ignition computer. A count value corresponding to the difference is added to the count value that determines the dwell time beginning and thereby provides another additional correction.

DRAWINGS

The invention is further described by way of illustrative example with reference to the annexed drawings, in which FIG. 1 is a block diagram of a circuit of an embodiment of the invention, and FIGS. 2 and 3 are signal timing diagrams for extending the operation of the circuit of FIG. 1.

DESCRIPTION OF THE ILLUSTRATED EMBODIMENT

Figure 1:
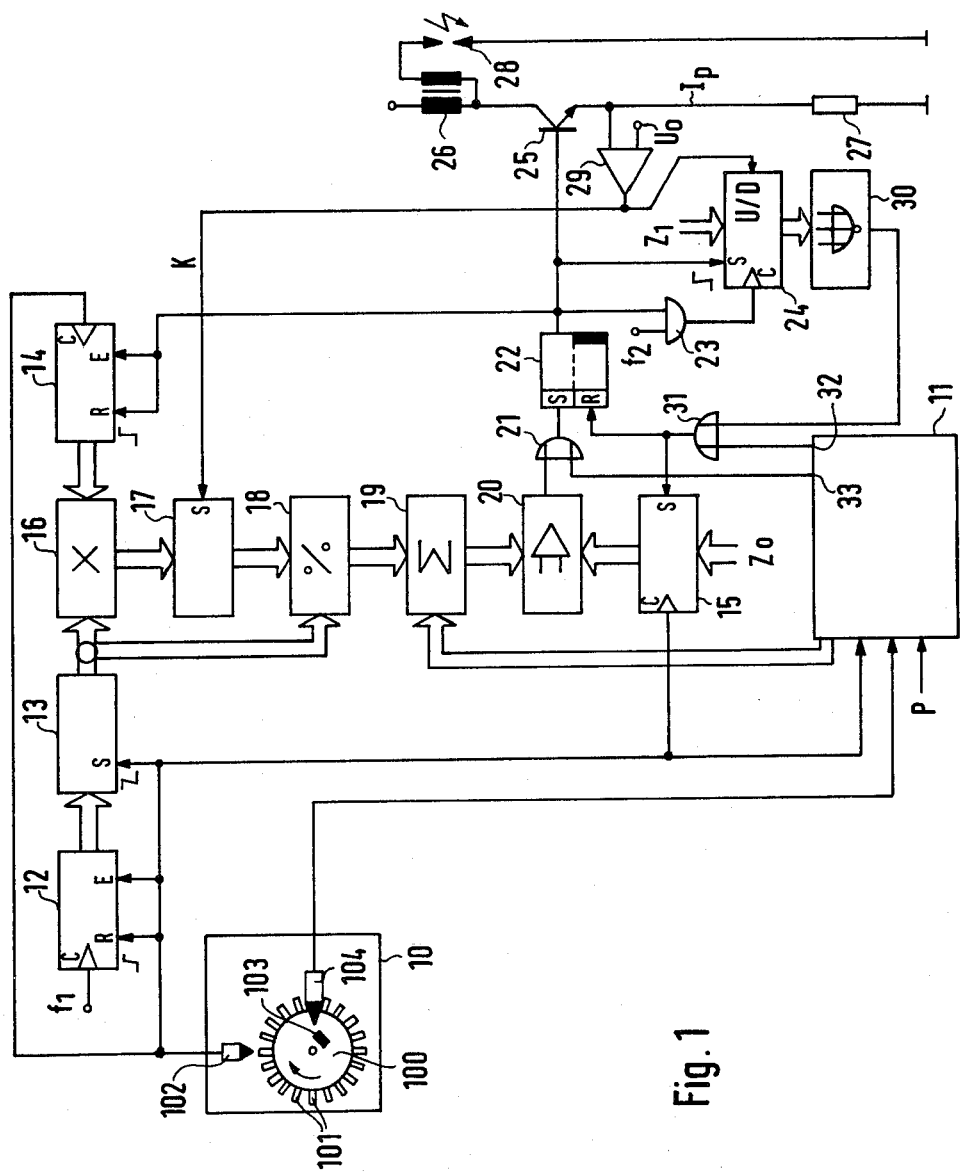

The incrementing transducer 10 consists of a toothed disk 100 connected preferably to the crankshaft of an internal combustion engine and provided with teeth 101 at equal intervals around the circumference for counting as increments of rotation. These teeth are sensed by a first pickup 102, each ferromagnetic tooth producing an inductance change in the inductive pickup 102 by which a signal is generated. Instead of ferromagnetic teeth other marks or features suitable for producing a response in some other kind of sensor could also be provided for generating incrementing signals. Thus, for example, the disk could be magnetized in stripes succeeding each other in the circumferential direction or an array of holes could be provided around the circumference of the disk through which an optical sensor could respond to a light.

A reference mark 103 is likewise provided on the disk 100. According to the number of desired ignition events per revolution of the toothed wheel 100, for example proportional to the number of cylinders of the internal combustion engine, a number of such reference marks 103 could be provided. It is also possible to derive additional reference marks electronically from a single reference mark 103. The reference mark 103 is sensed by a second pickup 104. For converting the output signals of the two pickups 103 and 104 pulse shaping stages, not shown in the drawing, are preferably provided for converting the pickup output signals into rectangular signals.

The two pickups 102 and 104 are connected to an ignition computer 11 in which the moment of ignition is calculated on the basis of the pickup signals and preferably also in dependence upon further parameters P. All this can be performed in accordance with predetermined ignition angle characteristic curves or characteristic fields. Such an ignition timing computation stage is known, for example, from German published patent application DE-OS No. 2 504 843. The transducer equipment 10 forms an ignition timing generator together with the ignition computer 11. In the simplest case, of course, the ingition timing generator can be constituted by the pickup 104 alone or combined with a simple ignition timing shift device such as one of the common centrifugal type.

The pickup 102 is connected with the reset input R and with the blocking input E of a first counter 12, with the set input S of another counter 13 connected as an intermediate storage device and with the dynamic count inputs C of the further counters 14 and 15. A frequency f1 which is very high compared to the frequency generated in the pickup 102 is applied to the dynamic count input counter 12. The count state outputs of this counter 12 are supplied to the count state inputs of the counter 13. The count state outputs of the latter and also the count state outputs of the counter 14 are supplied to a multiplier stage 16, of which the outputs are connected through a buffer store 17, that can be constituted as a counter, to the dividend inputs of a divider stage 18. The count state outputs of the buffer store 13 are connected to the divisor inputs of the dividing stage 18. The quotient outputs of the divider stage 18 are connected through an addition stage 19 to the first count inputs of a digital comparator 20 which has its second count inputs connected to the state outputs of the counter 15. The count state inputs of this counter 15 are—preferably by fixed wiring—supplied with the count start number Zo. Two count inputs of the addition stage 19 are connected with count outputs of the ignition computer 11.

The output of the comparator 20 is connected through an OR-gate 21 to the set input of a flipflop 22, of which the output is connected with the reset input R and with the blocking input E of the counter 14 and through an OR-gate 23 to the dynamic count input C of a counter 24, with the set input S of this counter 24, and with the base of transistor 25, of which the switching path is interposed in the primary current circuit of an ignition coil 26. In this primary current circuit there is also connected a current measuring resistor 27. The transistor 25, together with the ignition coil 26, forms a conventional final ignition stage, with at least one sparkplug 28 being connected in the secondary current circuit of the ignition coil 26. If two or more sparkplugs are necessary, a mechanical or electronic voltage distributor can be provided in a known way. The voltage drop across the measuring resistor 27 is supplied to a comparator 29, at the comparison or reference input of which a voltage value $U_o$ is applied that corresponds to the voltage drop and to the current value Io at the current measuring resistor 27 at the end of the fractional dwell time yet to be explained.

The output of the comparator 29 is connected to the set input of the intermediate store 17 and also with the countdirection input U/D of the up/down counter 24. A count state input of this counter 24 are connected—preferably by fixed wiring—with the fixed count value Z1. The count outputs of this counter 24 are connected through a decoding stage 30 with an input of an OR-gate 31, of which the output is connected both the set input of a counter 15 and also with the reset input of the flipflop 22.

An output 32 of the ignition computer delivers at each ignition moment an output signal that is supplied to the other input of the OR-gate 31. Another output 33 of the ignition computer supplies an output signal that precedes the ignition timing signal by a fixed number of increments. This signal is supplied to an input of the OR-gate 21 which, as above mentioned, also receives the output of the comparator stage 20.

The manner of operation of the embodiment illustrated in FIG. 1 is best explained with reference to the signal timing diagrams given in FIGS. 2 and 3. Reference numerals are given to the respective output signals corresponding to those of the components provided at the outputs of which they appear.

In the counter 12 a signal dependent upon speed is produced by means of counting upwards at the very high frequency f1 in the interval of an increment 101, which is to say during the presence of a signal U102. In the intervals between two successive signals U102 further counting is prevented by a signal at the blocking input E. The counter 12 is reset every time the rising edge of a signal 102 appears. By the trailing edge of a signal U102 the count state obtained is transferred into the buffer store 13, the stored content Z13 of which inversely corresponds to the actual speed value at the moment, i.e. with increasing speed the stored content Z13 diminishes.

Figures 2, 3:
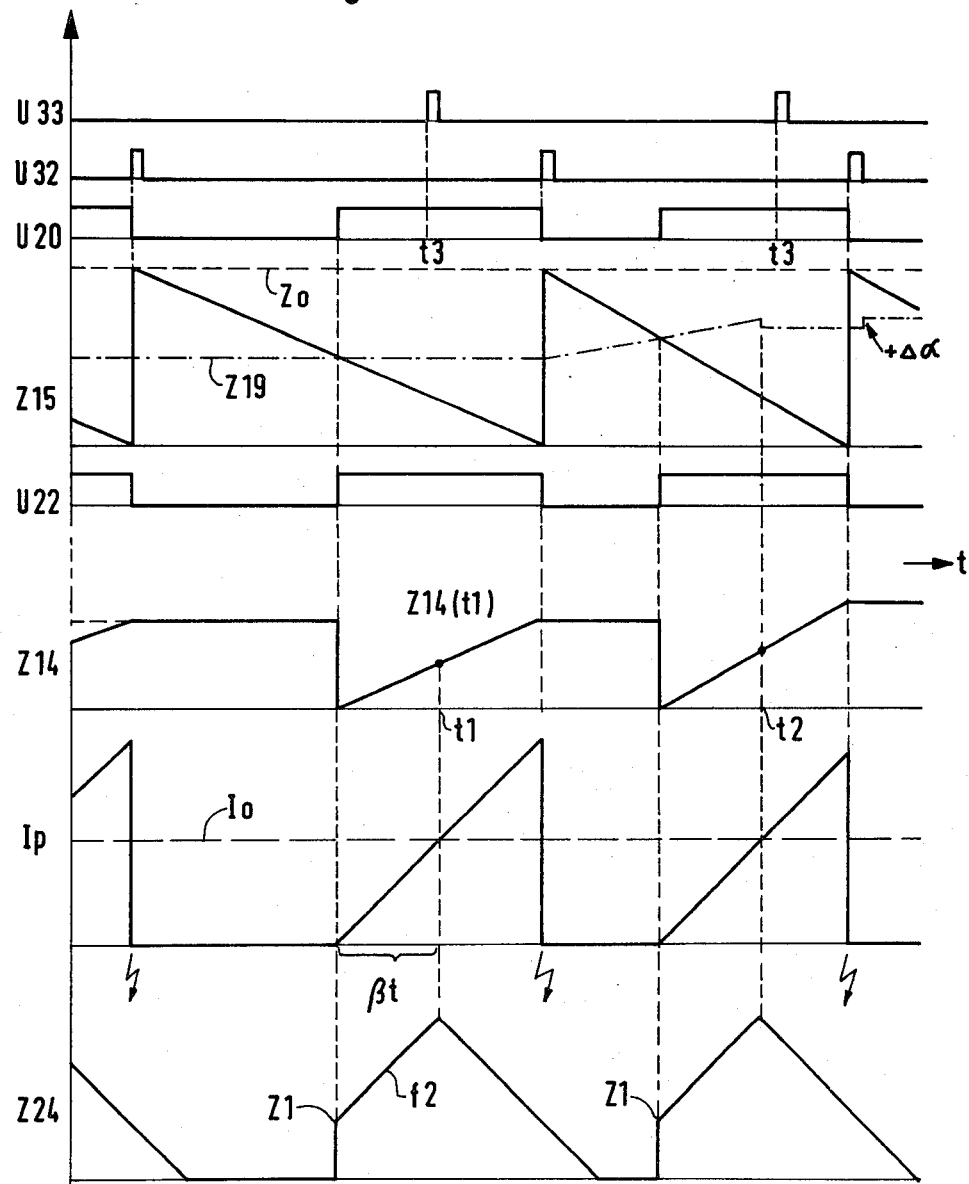

FIG. 2 shows the effect of the increase of speed over seven cycles, thus a reduction of the stored content Z13 (broken line). The stored content Z13 thus corresponds to the time duration Ti that is required by an increment feature 101 to pass by the pickup 102.

As a consequence of a signal at the output 32 of the ignition computer 11 the flipflop 22 is reset through the OR-gate 31, so that the transistor 25 is blocked, timing the ignition by producing a spark at that moment in the sparkplug 28. At the same time, the counter 15 is set to the fixed count value Z1 by the output of the OR-gate 31 and begins to count downwards at the rhythm of the signals of the pickup 102, thus at a rate dependent upon speed. When this count reaches the value Z19 provided at the output of the adding stage 19 the comparator 20 provides an output signal which again sets the flipflop through the OR-gate 21. The transistor 25 then again becomes conducting and a current Ip begins anew to flow in the primary current circuit of the ignition coil 26. At the same time the counter 14 is released and begins to count upward at the rhythm of the increments 101.

At the moment t1 the rising current Ip reaches the value Io which in the illustrated case corresponds to half of the ultimately desired current value. The comparator 29 responds and produces a set signal for the intermediate store 17. The product $Z13 \times Z14 \times K$ then present is transferred into the store 17. The factor K is the factor for going up from the fractional dwell time to the full dwell time. Since the fractional dwell time in the illustrated case is half of the full dwell time, K=2. This temporarily stored value is continuously divided in the divider stage 18 by the currently stored content Z13. The fractional dwell angle $\beta t$ constituted by the count value Z14 at the moment t1 is thereby multiplied by a correction factor Tio/Ti. This factor provides a correction dependent upon acceleration, because Tio representes the time of passing of an increment at the moment t1, and the factor Ti represents the current increment passing time. The ultimate factor $2 \times \beta t \times Tio/Ti$ thus provides in substance the threshold value for the comparator 20 at the reaching of which the dwell time beginning is triggered. To this value there is further added a quantity $\Delta \alpha$ in the addition stage 19. This addition corresponding to the difference between the current ignition angle and the ignition angle of the previous period. When the ignition angle changes, for example under dynamic behavior of the engine, correction of the dwell angle is correspondingly produced.

These supplementary precautions can of course be omitted in a more simple embodiment. The threshold value Z19 which determines the beginning of the dwell as described above is expressed as $$2 \times \beta t \times Tio/Ti + \Delta\alpha.$$

In stationary operation, as is shown in the first count cycle of the counter 15 in FIG. 3, Tio/Ti=1 and $\Delta\alpha=0$, so long as no other parameters P modify the ignition timing. In the next succeeding cycle an acceleration occurs by which Tio becomes smaller. This leads to a rise of Z18 and Z19. The result is that Z19 is reached earlier by Z15 and the current flow therefore begins sooner. Two factors take care of an advance of the beginning of the dwell; on the one hand the increase of the count state Z19 and on the other the more rapid down counting in the counter Z15 as a result of the higher velocity of the transducer disk 100.

At the moment t2 there is a jump of the count value Z19, because at this moment a new value Tio multiplied by the factor 2 and the factor $\beta t$ is stored in the buffer store 17. Since the value of Tio, as a result of the acceleration that has been detected is smaller in comparison than the previous period a jump in the value Z18 results and accordingly also in Z19.

Because of the increase of speed the ignition timing, an event that follows the moment T2, is also shifted, so that now a value $\Delta\alpha$ is provided by the ignition computer 11 to the addition stage 19. This value $\Delta\alpha$ leads to a renewed jump of the count value Z19. The jump naturally takes place in the same direction as the ignition angle change. If the ignition timing is advanced, i.e. the ignition angle enlarged, the beginning of the dwell period is also advanced, i.e. the count value Z19 is raised.

In order to provide starting conditions, the ignition computer 11, at its output 33, provides a signal in advance of the ignition timing moment by a fixed number of increments. By this signal the flipflop 22 is set and a current flow Ip is thereby started. In this way a first dwell angle is formed which permits a start up of the system. The signal U33 serves also at higher speeds for auxiliary initiation of the dwell angle at the moment t3 if at this moment, for example in the case of a malfunction, no dwell time has yet begun. This signal U33 can preferably also be timed by a fixed number of increments before or after the reference mark 103 for its appearance.

The counter 24, in connection with the decoding stage 30, serves for generating an end point for the initial dwell time and later, during operation, it provides an auxuliary ignition timing, i.e. the ingition pulse will be triggered in any event (at the latest) through the decoding stage 30, if the ignition event has not already been triggered through the output 32 of the ignition computer 11. For this purpose at the beginning of the dwell time the counter 24 is set at the fixed count value Z1 through the output of the flipflop 22 and begins to count upward at the rhythm of frequency f2. When and if the comparator 29 responds to the overstepping of the voltage Uo, the count direction of the reversible counter 24 is reversed and a backward counting operation is begun until the decoding stage 30 responds. In the illustrated case the latter event occurs when the count value 0 is reached. The flipflop 22 is then reset by the decoding stage 30. If the count value Z1 should be equal to 0, the duration of the upwards counting operation would be equal to the duration of the downwards counting operation. In this case the signal of the decoding stage 30 in stationary operation of the engine would coincide in time with the ignition timing signal provided by ignition computer 11. By the setting of the counter 24 to the count value Z1 a retarding shift of the trigger signal produced by the decoding stage 30 is provided, so that in dynamic operation (car moving) and normally functioning ignition computer, the signal of the ignition computer appears first.

Although the invention has been described with reference to a particular illustrated embodiment, it will be understood that variations and modifications are possible within the inventive concept. For example multiplication by the factor K can be done either in a multiplier stage or by adding the output of divider 18 K times (and $\Delta\alpha$ once) in adder 19.

I claim:

1. An ignition system for an internal combustion engine including an ignition coil having primary and secondary windings, ignition timing shift means for determining the ignition moment of each cycle of the system, an interruptor switch in circuit with said primary winding electrically controllable so as to provide timing of ignition in response to said ignition shift means by primary circuit interruption and also controllable in circuit closure to provide dwell time for ignition coil energization, said system further comprising;

a generator of engine rotation increment signals including a rotary device driven by said engine;

means for counting the number of said increment signals during the initial fraction ($\beta t$) of dwell time in which the current in said primary winding builds up to a predetermined value (Io) and for storing said number;

means (16, 17) for deriving from said number a larger number of increment signals determining a first approximation of the full dwell time;

means (18) for correcting the output of said number deriving means by the ratio of the duration of the increment signal from said generator appearing at a predetermined point of the cycle of operation of the system to the duration of the most recent increment signal from said generator, and means responsive to the corrected derived number provided by said deriving and correcting means to determine the beginning of dwell time.

2. An ignition system as defined in claim 1 in which second counting means counting at the rhythm of said increment signals are provided and also means for setting the content of said second counting means at a predetermined value at the beginning of operation of said second counting means, said means responsive to said corrected derived number being responsive also to the output of said second counting means for determining the beginning of dwell time.

3. An ignition system as defined in claim 2 in which said means responsive to said corrected derived number includes a comparator for comparing the output of said second counting means with said corrected derived number.

4. An ignition system as defined in claim 1 in which said predetermined point of the cycle of operation of the system is the end of said initial fraction ($\beta t$) of dwell time.

5. An ignition system as defined in claim 1 in which said correcting means is provided with means for generating a fixed frequency, third counting means for counting at said fixed frequency to produce a count value representative of the duration of each increment signal, and means for storing said count value until it is replaced by the count value for the next increment signal.

6. An ignition system as defined in claim 5 in which said correcting means include means for multiplying the output of the first counting means by the output of said third counting means at the end of said initial fraction of dwell time and storing the product thereby formed and means for dividing the product so stored by later count results of said third counter.

7. An ignition system as defined in claim 1 including means for generating an auxiliary signal (U33) for causing the beginning of dwell time no later than at a moment, in each cycle of the system, preceding or following a fixed point of said cycle by a fixed number of increment signal repetition periods.

8. An ignition system as defined in claim 7 in which said fixed point in each cycle is the moment of ignition.

9. An ignition system as defined in claim 7 in which said fixed point in each cycle is determined by the appearance of a signal generated by a reference mark provided on said rotary device.

10. An ignition system as defined in claim 1 in which there are provided fourth counting means (24), means for generating a second fixed frequency (f2) supplied to said fourth counting means for determining its counting rate during said initial fraction of dwell time and also means for providing a fixed count value (Z1) to said fourth counting means, said fourth counting means being connected so as to count down said fixed value, and a decoding means (30) for producing an auxiliary control signal for the ignition timing when said fourth counting means reaches another fixed count value set in said decoding means.

11. An ignition system as defined in claim 1 in which said ignition timing shift means are constituted as an ignition timing computer (11) incorporating a capability of computing the difference between a preceding ignition angle and the current ignition angle provided by the computer in real time and for providing a count value corresponding to said difference for addition to said corrected derived number for further correction thereof, said system also including an addition stage for adding said count value corresponding to said difference to said corrected derived number provided by said deriving and correcting means.

* * * * *